(12) United States Patent
Anderson et al.

(10) Patent No.: US 6,463,871 B1
(45) Date of Patent: Oct. 15, 2002

(54) WOOD REPLACEMENT SYSTEM AND METHOD

(75) Inventors: Robert Phillip Anderson, Westchester; Kimberly Ann Whitley, Hamilton; Louis Paul Schaefer, Cincinnati, all of OH (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 09/799,211

(22) Filed: Mar. 5, 2001

(51) Int. Cl.[7] .............................. B63B 5/24; B63B 5/02; B27M 3/00
(52) U.S. Cl. ..................... 114/357; 114/358; 144/330
(58) Field of Search ................... 114/355, 357, 114/358; 144/330, 332

(56) References Cited

U.S. PATENT DOCUMENTS

| | | | |
|---|---|---|---|
| 2,980,153 A | * 4/1961 | Burch | ................ 114/358 |
| 3,372,408 A | 3/1968 | Luger et al. | |
| 3,619,228 A | * 11/1971 | Hallonquist et al. | ........ 427/140 |
| 4,760,811 A | 8/1988 | Hopper | |
| 5,036,788 A | 8/1991 | Unger | |
| 5,192,809 A | * 3/1993 | Jones et al. | ................ 521/40 |
| 5,207,172 A | 5/1993 | Wolter | |
| 5,266,245 A | 11/1993 | Wellings | |
| 5,277,145 A | 1/1994 | Hordis | |
| 5,372,763 A | 12/1994 | Hordis | |
| 5,549,969 A | * 8/1996 | Parish | ................ 428/301.4 |
| 5,601,049 A | 2/1997 | Hordis et al. | |
| 5,758,594 A | 6/1998 | Siewert | |
| 5,843,221 A | * 12/1998 | Parish | ................ 106/469 |
| 5,853,650 A | 12/1998 | Lonno et al. | |
| 5,865,231 A | * 2/1999 | Korhonen et al. | ....... 144/24.16 |
| 6,032,606 A | 3/2000 | Fulks | |
| 6,265,027 B1 | * 1/2001 | Johnston et al. | ............ 427/368 |

FOREIGN PATENT DOCUMENTS

FR 1374860 8/1964

* cited by examiner

Primary Examiner—Sherman Basinger
(74) Attorney, Agent, or Firm—Killworth, Gottman, Hagan & Schaeff, L.L.P.

(57) ABSTRACT

Methods, compositions and boat hulls are disclosed using and forming a wood replacement surface. The wood replacement surface is used as a replacement or substitute for wood surfaces. The wood replacement surface of the present invention has improved characteristics, such as strength and water resistance, compared to conventional wood surfaces. The wood replacement surface is resistant to environmental conditions such as water, heat and sunlight. The wood replacement surface is easier to apply than conventional wood surfaces.

20 Claims, 2 Drawing Sheets

WOOD REPLACEMENT SYSTEM AND METHOD

FIELD OF THE INVENTION

This invention relates to environmentally resistant fabrication materials, and more particularly, to a barrier coat layer and core material to be used in combination with other manufactured materials to provide an environmentally resistant structure which can be used in place of wood surfaces.

BACKGROUND OF THE INVENTION

Wood has long been used as a material for structures used in intense environmental conditions. Wood is used for structures such as decks, boat hulls, docks and the like. These structures face a wide variety of environmental conditions such as water, heat, sun and humidity. These conditions can cause the wood to suffer damage such as blistering, weakening, warping, deforming and rotting. This damage is highly undesirable and can cause disastrous results in structures such as boat hulls.

Various methods have been used to prevent damage to wood subjected to environmental conditions. These methods usually employ stains, marine varnishes and other protective coatings that are physically applied to the wood surface to attempt to protect the wood. These methods require repeated maintenance and monitoring and even then often fail. Additionally, they require a large amount of costly manual labor.

Some methods and systems have avoided the problems of wood being exposed to environmental conditions by building structures, such as boat hulls, out of other materials, such as fiberglass or aluminum, instead of wood. One such method is U.S. Pat. No. 5,601,049, Hordis et al, where a boat hull is protected against blistering on the underwater surface by using successive layers of fiber reinforced synthetic plastic and having an outer gelcoat layer and a barrier coat material of microspheres thoroughly mixed in a synthetic resin. Another method and system is disclosed by U.S. Pat. No. 5,277,145, Hordis, which teaches inserting a core of syntactic foam between an inner transom wall and an outer transom wall.

Another method of avoiding problems of wood being exposed to environmental conditions is seen in fabricating high strength boat transoms. Many transoms are fabricated using marine or exterior grade plywood with layers of fiberglass and resin on each face. However, after a short time, small leaks develop in the plastic skin and fastener holes. This causes water to be soaked up by the plywood core which in turn causes the plywood to suffer damage. U.S. Pat. No. 5,036,788, Unger, describes a method of doing so and attempts to avoid leaks by applying an outer skin to the wood while the transom is still in the hull mold. However, Unger requires the use of molds and forms which can make it difficult in application.

Another method and system is disclosed by U.S. Pat. No. 5,207,172, Wolter, which discloses forming a boat deck surface comprising at least two layers. One layer contains a slow hardening elastic resin and a solid particulate and another layer contains a slow hardening elastic resin, a solid particulate and a coloring agent. Wolter is generally used for repairing boat decks. Wolter uses a flowable epoxy and requires forming a first layer, curing, then forming a second layer and curing.

Other methods attempt to reinforce plywood or wood. However, the inherent weakness of wood in resisting flexibility and resisting environmental exposure remains causing the results of these methods to be less than desirable.

What is needed is a method and system for replacing wood surfaces with a non-wood surface that is highly resistant to environmental conditions and easy to fabricate and apply.

SUMMARY OF THE INVENTION

This need is met by the present invention by providing an easily applied coating or surface that is highly resistant to environmental conditions.

A method of replacing a wood surface with a wood replacement surface according to one embodiment of the present invention is disclosed. A wood surface is removed from a structure. A wood replacement composition is sprayed or poured on the surface of the structure. The wood replacement composition is catalyzed forming the wood replacement surface. The wood replacement surface is resistant to environmental conditions.

Also disclosed is a composition and a method of fabricating a sprayable, pourable composition which can be used to produce articles and surfaces where wood or particle board might otherwise be used. One or more resins are provided. A monomer is provided. A thickening agent such as clay is provided. The provided materials are mixed. Fumed silica (optional) and one or more accelerators are provided. The provided materials are mixed. Hollow spheres and other fillers are then provided. The provided materials are mixed forming the composition.

A boat hull according to another embodiment of the present invention is disclosed. The boat hull includes at least one laminated fiber layer and a wood replacement layer. The at least one laminated fiber layer has an outer surface, which includes a gel coat. The wood replacement layer is formed from mixing resin, a monomer, thickening agent, accelerators, hollow spheres and other fillers. The wood replacement layer is formed interiorly of the gel coat layer.

BRIEF DESCRIPTION OF THE SEVERAL VIEWS OF THE DRAWINGS

The following detailed description of the present invention can be best understood when read in conjunction with the accompanying drawings, where like structure is indicated with like reference numerals.

DETAILED DESCRIPTION OF THE INVENTION

Figure 1:
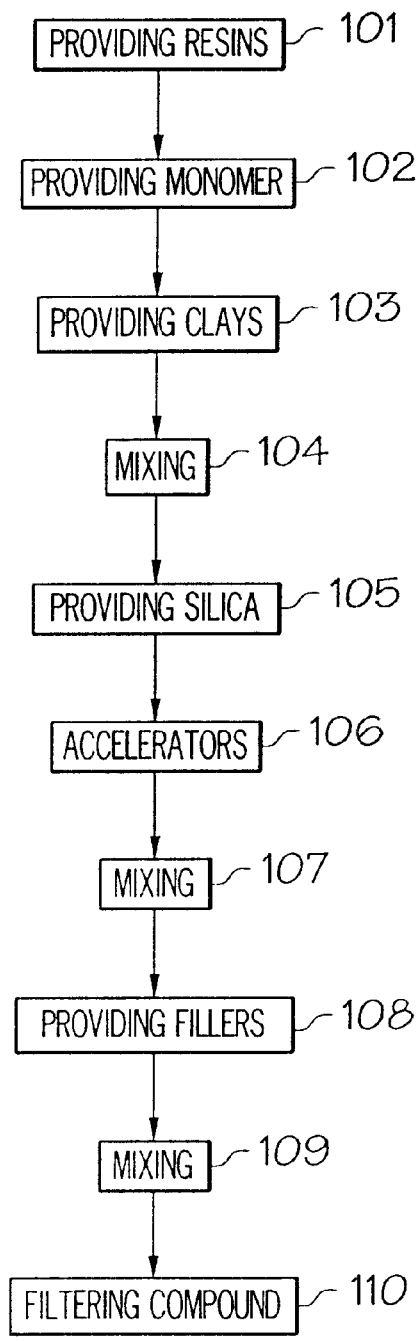
FIG. 1 illustrates a method of fabricating a sprayable, pourable composition according to one embodiment of the present invention.

FIG. 1 illustrates a method of fabricating a sprayable, pourable composition which can be used to produce articles and surfaces where wood or particle board might otherwise be used. One or more resins are provided at block 101. Typically, a polyester resin of 40–60 percent, by weight, of the composition and a vinyl ester resin of 10–20 percent are provided. Suitable resins can be obtained from Reichhold Chemical. A monomer may be added in an amount of 0–20%.

The monomer is provided at block 102. The monomer, which may be a styrene monomer, typically is 5–20 percent of the composition. By using lower amounts of the styrenic component, a low VOC composition is produced. It is also possible to use non-styrenic, VOC compliant materials in place of the styrene monomer. A thickening agent, such as thixotropic clays, provided at block 103. Suitable thixotropic clays can be purchased from Southern Clay Products, Inc. They may be present in an amount of 1–15%. The provided materials are mixed together for about 15 minutes at block 104. They can be mixed in a conventional mixer.

Fumed silica is provided at block 105. The preferred amount fumed silicon is 0–3%. It may be added before or after block 104. Fumed silicas can be obtained from Dè Gussa Co. among others. One or more accelerators are provided at block 106. The one or more accelerators can be DMPT, DMA, DMAA, cobalt octoate, potassium octoate, copper napthanate and quaternary ammonium salts. The accelerators generally comprise 0.1–5 percent of the composition. The provided materials are mixed together for about 5 minutes at block 107.

Fillers, i.e. hollow spheres or microspheres and optionally other fillers, are provided at block 108. Hollow microspheres can be obtained from PQ Corporation, Expancel Inc., and others. Other fillers include wollastonite fibers (available from Nyco Minerals, Inc.) and mica fillers (available from Zemex Industrial Minerals). The fillers generally comprise 1–25 percent of the total composition. The provided materials are mixed together for about 20 minutes at block 109 forming the sprayable, pourable composition. The composition is filtered through a mesh filter at block 110.

This composition can then be poured or sprayed along with a catalyst to form an article or surface which is environmentally resistant. It is useful in producing boat hulls, docks, decks, floors, buildings and other structures which are used in harsh environmental conditions.

Figure 2:
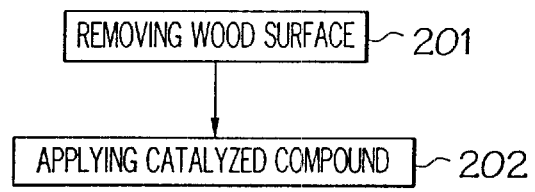
FIG. 2 illustrates a method of replacing a wood surface with a wood replacement surface according to another embodiment of the invention.

FIG. 2 illustrates a method of replacing a wood surface with a wood replacement surface according to another embodiment of the present invention. A wood surface is removed from a structure at block 201. The wood surface may be comprised of a material such as plywood or any other wood material or product commonly used. The structure can be a boat hull, a dock, a deck floor, building or other structure. Generally, the present invention can be used as a replacement for wood anywhere the wood surface and structure are subjected to intense environmental conditions such as water, humidity and sunlight. The damaged wood surface can be removed by any number of conventional methods such as sanding, sawing or cutting.

A wood replacement composition, which is the same as the composition discussed above, is sprayed or poured on the surface of the structure in areas where the wood surface was previously removed at block 202. The composition is added to a catalyst and applied. When sprayed, it can be mixed with a catalyst either externally or internally of the spray nozzle as disclosed in U.S. Pat. No. 5,371,117, which is incorporated herein by reference. A suitable catalyst is methyl ethyl ketone peroxide, however other materials may be used as a catalyst. The wood replacement surface formed is resistant to environmental conditions such as water, humidity and sunlight. The wood replacement surface forms a barrier against water vapor transmission and is highly resistant to rot. Additionally, the wood replacement surface has good compressive, shear, flexural, and tensile strength, has good memory and is able to hold a fastener.

In alternate embodiments, the wood replacement surface can be formed on the surface of structures without removing a wood surface. The wood replacement surface can be formed on top of an existing wood surface or can be formed on the surface of the structure instead of forming a wood surface.

Figure 3:
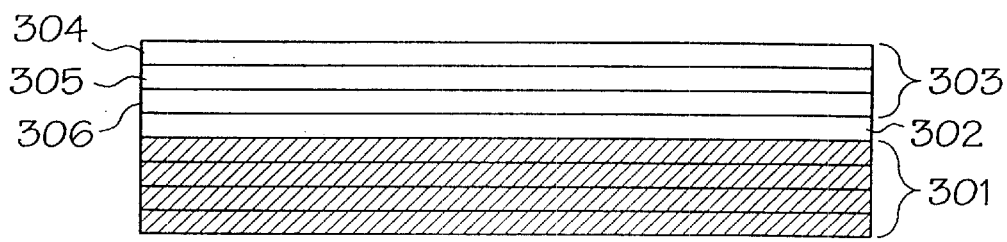
FIG. 3 is a cross-section of a boat hull according to another embodiment of the present invention.

FIG. 3 illustrates a boat hull according to another embodiment of the present invention. The boat hull comprises at least one fiber reinforced synthetic plastic layer 301 and a wood replacement layer 302. The boat hull also has an outer surface 303. Laminated fiber layers are commonly used in boat hull construction, see Hordis U.S. Pat. No. 5,601,049, which is hereby incorporated by reference.

The wood replacement layer 302 is formed between the outer surface 303 and inner surface of at least one layer 301. The outer surface 303 may for example be gel coat 304, barrier layer 305 and skin coat 306 of the type described in Hordis U.S. Pat. No. 5,601,049. The wood replacement layer is formed with a desired thickness by mixing the wood replacement composition, i.e. resin, a monomer, accelerators, thickening agent and fillers with a catalyst and applying it by spraying or pouring.

Figure 4:
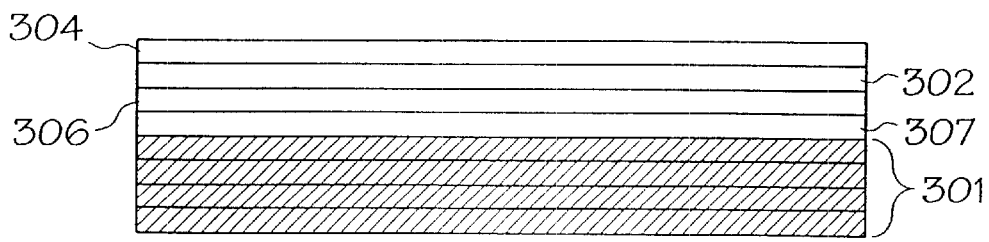
FIG. 4 is a cross-section of a boat hull according to another embodiment of the present invention.

FIG. 4 is similar to FIG. 3 except that the wood replacement layer 302 of the present invention is used in place of barrier layer 305 of FIG. 3 and the core 307 may be another wood replacement layer like 302, a standard core material as shown in Hordis U.S. Pat. No. 5,601,049, or a foam core as in Hordis U.S. Pat. No, 5,277,145.

The desired thickness of the wood replacement layer 302 can vary between 1 and 750 mils. However, an example of a desired thickness is ⅜ of an inch. With such a thickness, the wood replacement layer would have a shear strength of about 705 psi, a compressive strength of about 2544 psi and a water absorption of about 0.2 percent.

Table 1 shows experimental results of a ⅜ inch thick wood replacement layer formed according to an embodiment of the present invention compared with ⅜ inch thick plywood and ⅜ inch balsa. It can be readily seen that the wood replacement layer provides shear strength and compressive strength. Furthermore, the wood replacement layer is superior at preventing water absorption.

TABLE 1

|  | 3/8 Balsa | 3/8 Plywood | wood rep. sur. |
| --- | --- | --- | --- |
| Shear Strength (psi) | 358 | 263 | 705 |
| Shear Modulus (psi) | 5347 | 6210 | 6538 |
| Flex Strength (psi) | 11025 | 7917 | 19427 |
| Flex Modulus (msi) | 1.03 | 0.97 | 0.88 |
| Tensile Strength (psi) | 10,091 | 9,019 | 7,191 |
| Tensile Modules (msi) | .8 | 1.23 | .55 |
| Compressive Str. (psi) | 604 | 901 | 2544 |
| Compressive Mod. (psi) | 4739 | 8917 | 49645 |
| Fastener Withdrawal (lbs) | 290 | 294 | 371 |
| Water Absorption (%) | 4.7 | 15.3 | 0.2 |

The wood replacement surface of the present invention is easier to apply than conventional wood surfaces. The surface can be sprayed or poured on. Multiple layers of the wood replacement surface are allowable, but not required unlike other conventional surfaces.

Many variations of the disclosed embodiment are possible in accordance with the present invention. The embodiments can be used with boat hulls, decks, docks, floors, buildings or any surface exposed to environmental conditions.

Having described the invention in detail and by reference to preferred embodiments thereof, it will be apparent that modifications and variations are possible without departing from the scope of the present invention defined in the appended claims. Other suitable materials may be substituted for those specifically recited herein.

What is claimed is:

1. A method of repairing a wood surface with a wood replacement surface comprising:
   removing a wood surface from a structure to form an area with a removed surface and a remaining surface;
   spraying or pouring a wood replacement composition and a catalyst onto the remaining surface of said area with the removed surface, to form a wood replacement surface, said wood replacement composition comprising:
   vinyl ester resin in combination with polyester resin;
   a monomer;
   a thickening agent;
   accelerators; and
   fillers,
   wherein the resin, the monomer, the thickening agent, the accelerators, and the fillers are thoroughly mixed together prior to being used as a wood replacement composition.

2. The method of claim 1, wherein the catalyst is methyl ethyl ketone peroxide.

3. The method of claim 1, wherein the structure is a wood deck.

4. The method of claim 1, wherein the structure is a boat hull.

5. The method of claim 1, wherein the wood replacement surface is able to hold a fastener.

6. The method of claim 1, wherein the wood replacement composition comprises by weight:
   10–20% vinyl ester resin
   40–60% polyester resin
   0–20% monomer
   1–15% thickening agent
   0–3% fumed silica
   0.1–5% accelerators, and
   1–25% fillers.

7. A method of making a sprayable, pourable composition comprising:
   providing a vinyl ester resin of 10–20 weight percent of the composition;
   providing a polyester resin of 40–60 weight percent of the composition;
   providing a monomer of 0–20 weight percent of the composition;
   providing 1–15% thickening agent;
   mixing for about 15 minutes;
   providing 0.1–5 weight percent accelerators selected from the group consisting of DMPT, DMA, DMAA, cobalt octoate, potassium octoate, copper naphthanate, quaternary ammonium salts and mixtures thereof and 0–3 weight percent fumed silica;
   mixing for about 5 minutes;
   providing filler of 1–25 weight percent of the composition; and
   mixing for about 20 minutes.

8. The method of claim 7 further comprising:
   filtering the composition through a mesh filter.

9. A sprayable, pourable composition useful as a substitute for wood comprising:
   10–20% by weight vinyl ester resin;
   40–60% by weight polyester resin;
   a monomer;
   a thickening agent;
   accelerators; and
   fillers;
   wherein the resin, the monomer, thickening agent; the accelerators, and the fillers are thoroughly mixed together and added to a catalyst prior to being used as a wood substitute.

10. The composition of claim 9, wherein the accelerators comprise at least one material selected from the group consisting of DMPT, DMA, DMAA, cobalt octoate, potassium octoate, copper napthanate, quaternary ammonium salts, and mixtures thereof.

11. The composition of claim 9, wherein the fillers comprise hollow microspiheres and at least one material selected from the group consisting of potassium aluminum silicate and calcium silicate and wherein said thickening, agent is thixotropic clays.

12. The position of claim 11, wherein the hollow microspheres are comprised of a material selected from the group consisting of silicate glass, ceramic and plastic microspheres.

13. The composition of claim 11, further including fumed silica.

14. The composition of claim 13, wherein the composition comprises by weight:
   10–20% vinyl ester resin;
   40–60% polyester resin;
   0–20% monomer;
   1–15% thickening agent;
   0.–3% fumed silica;
   0.1–5% accelerators, and
   1–25% fillers.

15. A boat hull comprising:
   at least one fiber reinforced synthetic plastic layer,
   an intermediate layer of a desired thickness formed from mixing 40–60% by weight polyester resin and 10–20% by weight vinyl ester resin, a monomer, thickening agent, accelerators, filler, and a catalyst, and
   an outer layer.

16. The boat hull of claim 15, wherein said intermediate layer is formed from a composition comprising by weight:
   10–20% vinyl ester resin;
   40–60 polyester resin;
   0–20% monomer;
   1–15% thickening agent;
   0–3% fumed silica;
   0.1–5% accelerators, and
   1–25% filler,
   mixed with a catalyst.

17. The boat hull of claim 16 wherein the filler comprises hollow microspheres and at least one material selected from potassium aluminum silicate and calcium silicate, and wherein said thickening agent is thixotropic clays.

18. The boat hull of claim 17 wherein the hollow microspheres are comprised of a material selected from the group consisting of silicate glass, ceramic and plastic microspheres.

19. The boat hull of claim 18 wherein said accelerators comprise at least one material selected from the group consisting of DMPT, DMA, DMAA, cobalt octoate, potassium octoate, copper napthanate, quaternary ammonium salts, and mixtures thereof.

20. The boat hull of claim 15, wherein said intermediate layer has a shear strength of about 705 psi, a compressive strength of about 2544 psi, and a water absorption of about 0.2 percent.

* * * * *